(12) United States Patent
Fan et al.

(10) Patent No.: US 7,428,835 B2
(45) Date of Patent: Sep. 30, 2008

(54) COMPUTER ENCLOSURE WITH LOCKING APPARATUS

(75) Inventors: Chen-Lu Fan, Tu-Cheng (TW); Chieh Yang, Tu-Cheng (TW); Li-Ping Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 8 days.

(21) Appl. No.: 11/306,536

(22) Filed: Dec. 31, 2005

(65) Prior Publication Data

US 2007/0151313 A1    Jul. 5, 2007

(51) Int. Cl.
 *E05B 27/06* (2006.01)
 *A47B 81/00* (2006.01)
(52) U.S. Cl. .................... 70/358; 312/223.2
(58) Field of Classification Search ............. 70/358, 70/120, 118, 103, 108, 109, 113, 130, 134; 312/223.2, 265.5, 265.6; 292/163–164, 137, 292/152, 303, 252; 109/67
See application file for complete search history.

(56) References Cited

U.S. PATENT DOCUMENTS

| | | | | |
|---|---|---|---|---|
| 1,594,152 A * | 7/1926 | Chason | | 70/82 |
| 1,854,080 A * | 4/1932 | Tonnessen | | 70/134 |
| 4,037,440 A * | 7/1977 | Shabtai et al. | | 70/108 |
| 4,362,034 A * | 12/1982 | Amgar | | 70/108 |
| 5,339,659 A * | 8/1994 | Guzzinati | | 70/120 |
| 5,576,926 A * | 11/1996 | Monsorno | | 361/303 |
| 5,816,076 A | 10/1998 | Bierdermann et al. | | |
| 5,857,364 A * | 1/1999 | Hsu et al. | | 70/120 |
| 6,038,892 A * | 3/2000 | Schmitt | | 70/78 |
| 7,166,799 B2 * | 1/2007 | Chen et al. | | 174/50 |
| 7,230,824 B2 * | 6/2007 | Wei-Chieh et al. | | 361/685 |
| 7,327,565 B2 * | 2/2008 | Chen et al. | | 361/685 |
| 2005/0200248 A1 * | 9/2005 | Chen et al. | | 312/223.2 |
| 2005/0264142 A1 * | 12/2005 | Cunningham et al. | | 312/223.2 |

* cited by examiner

*Primary Examiner*—Patricia Engle
*Assistant Examiner*—Kristina R Fulton
(74) *Attorney, Agent, or Firm*—Wei Te Chung

(57) ABSTRACT

A computer enclosure with a locking apparatus includes a front panel (10), a side panel (30), a driving member (52), and a sliding member (55). The side panel has an engaging portion (351). The driving member is pivotable about an axis perpendicular to the front panel, and defines an arcuate portion (531). The sliding member is slidably attached to the front panel. The sliding portion has a stop portion (557) and a driving pin (571). When the driving member is rotated, the arcuate urges the driving pin of the sliding member for driving the sliding member to move, thereby the stop portion engaging with the engaging portion of the side panel and preventing the engaging portion from moving away from the front panel.

7 Claims, 11 Drawing Sheets

COMPUTER ENCLOSURE WITH LOCKING APPARATUS

FIELD OF THE INVENTION

The present invention relates to locking apparatuses, and more particularly to a convenient locking apparatus for preventing a computer in a public location from being opened or tampered with.

DESCRIPTION OF RELATED ART

Previously, a side panel of the computer was typically secured to the computer enclosure by retaining screws. In the process of mounting or removing components in the computer enclosure, it was necessary to remove the individual retaining screws first. However, there were a plurality of screws used in the computer enclosure, and it was laborious to manipulate the screws frequently. Furthermore, the tiny screws were easily lost or dropped in among the components of the computer. If the screw was not removed carefully, damage to the computer and its components could occur.

A conventional computer is disclosed. A computer casing includes a frame and a pair of side panels secured to the frame. The frame includes a bottom panel, a top panel, a front panel, and a rear panel. The front and rear panels are engaged between the top panel and the bottom panel. A pair of first flanges extends from opposite edges of the bottom panel. A pair of second flanges depends from opposite edges of the top panel. Each first flange defines a plurality of rectangular slots therein. Each second flange defines a plurality of second slots therein. A pair of hems is formed at top and bottom edges of each side panel. Each hem forms a plurality of hooks for engaging with the slots of the flanges, thereby securing the side panels to the frame to form the complete computer casing.

However, the conventional side panel of the computers are always assembled to the computer by screws or hooks, so that they do not provide a great deal of security against theft.

What is needed, therefore, is a convenient locking apparatus in the computer for preventing the computer from being opened or tampered with.

SUMMARY OF INVENTION

A computer enclosure with a locking apparatus includes a front panel, a side panel, a driving member, and a sliding member. The side panel has an engaging portion. The driving member is pivotable about an axis perpendicular to the front panel, and defines an arcuate portion. The sliding member is slidably attached to the front panel. The sliding member has a stop portion and a driving pin. When the driving member is rotated, the arcuate portion urges the driving pin of the sliding member for driving the sliding member to move, thereby the stop portion engaging with the engaging portion of the side panel and preventing the engaging portion from moving away from the front panel.

Other advantages and novel features will be drawn from the following detailed description of a preferred embodiment with attached drawings, in which:

DETAILED DESCRIPTION

Figure 1:
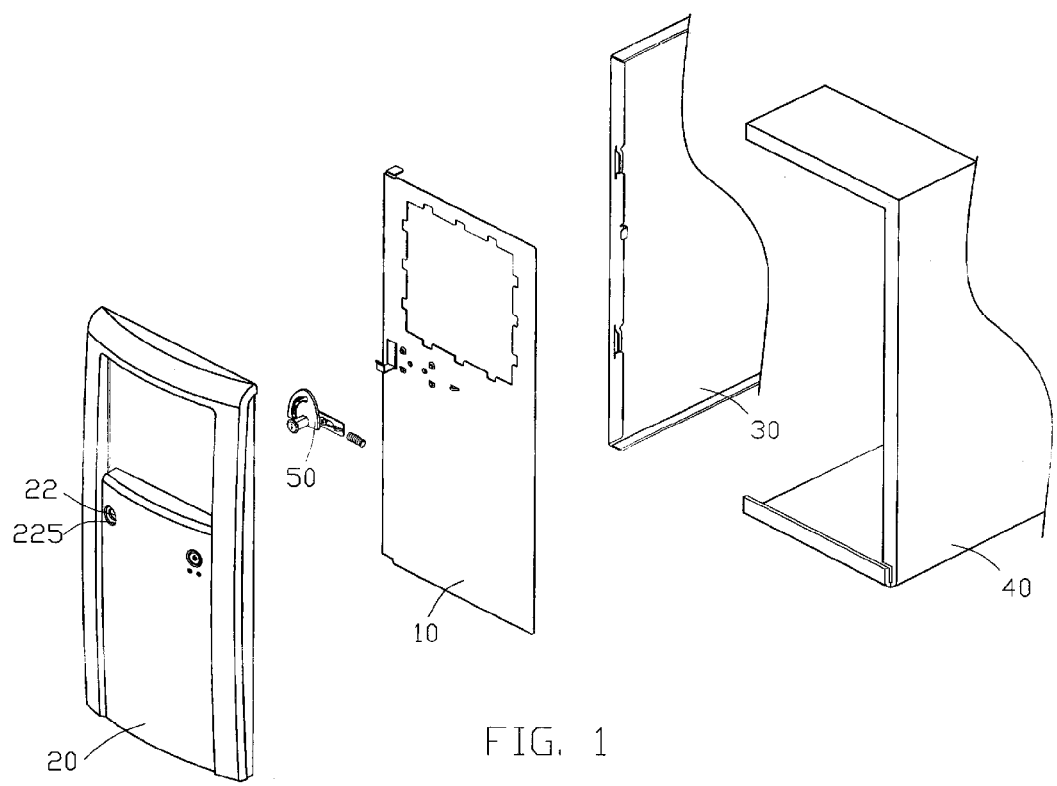
FIG. 1 is an exploded, isometric view of a computer enclosure with a locking apparatus of a preferred embodiment of the present invention, the computer enclosure including a chassis, a front bezel, a locking apparatus, a front panel, and a side panel.

Referring to FIG. 1, a computer enclosure with a locking apparatus of a preferred embodiment of the present invention includes a front panel 10, a front bezel 20, a side panel 30, a chassis 40 and a locking apparatus 50. The front bezel 20 defines a locking hole 22. A locking flange 225 is formed in the locking hole 22.

Figure 2:
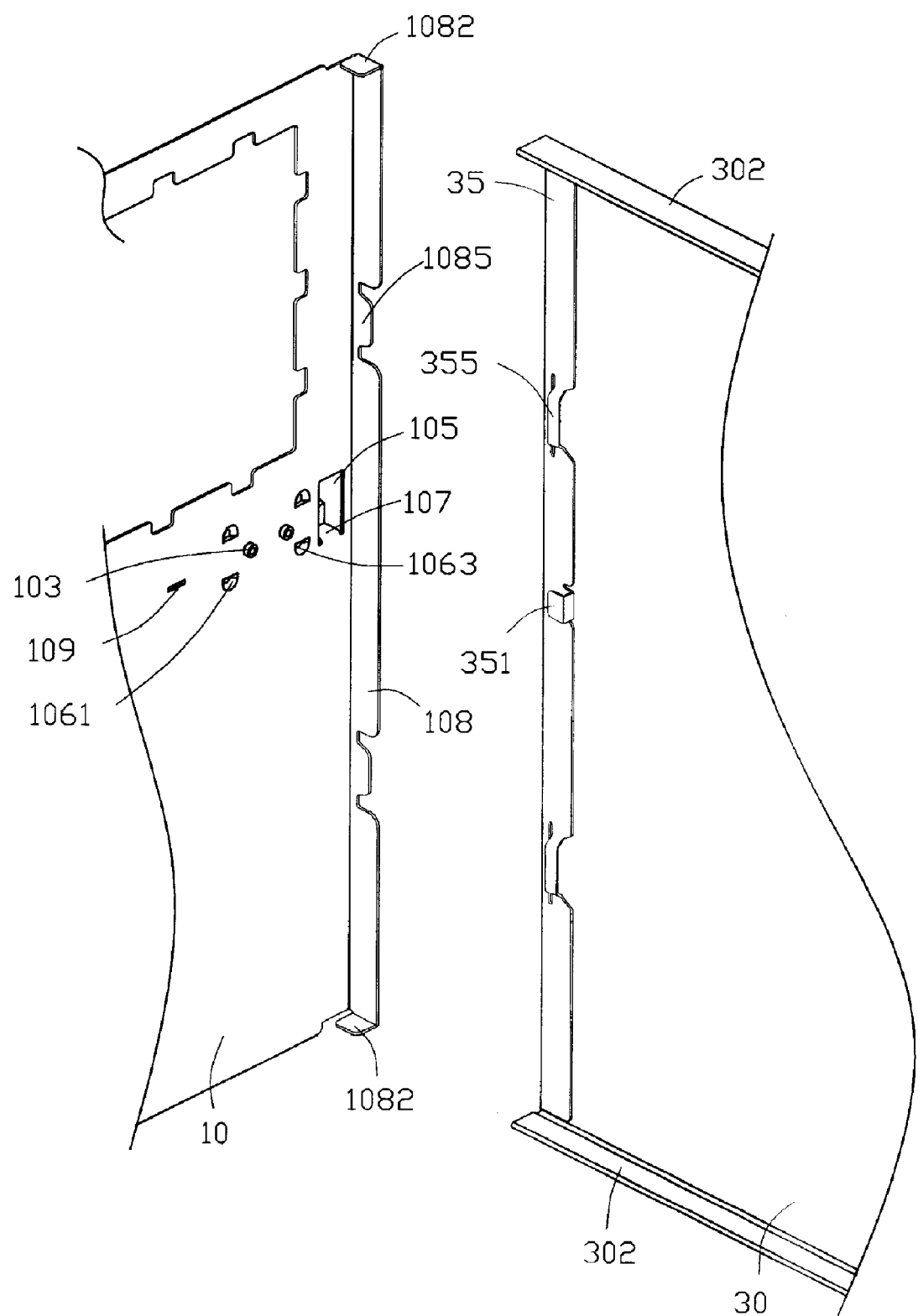
FIG. 2 is an isometric, partial view of the front panel and the side panel of FIG. 1.

Referring also to FIG. 2, a fixing flange 108 is bent back and perpendicular from one edge of the front panel 10. A pair of fixing clips 1082 is bent perpendicular and in from opposite distal ends of the fixing flange 108. A pair of engaging tongues 1085 is formed in the fixing flange 108. A pair of hollow securing posts 103 protrudes back from a middle portion of the front panel 10. Two pairs of positioning tabs 1061, 1063 are formed adjacent the securing posts 103 of the front panel 10. A securing bridge 109 is formed outwardly on the front panel 10. A through opening 105 is defined between the securing posts 103 and the fixing flange 108 on the front panel 10. A restricting clip 107 is bent out from a bottom edge of the through opening 105. A pair of bending flanges 302 is bent in and perpendicular from opposite sides of the side panel 30. A securing flange 35 is bent back from a front edge of the side panel 30. A pair of receiving bridges 355 is formed on the securing flange 35 each defining an opening for receiving the corresponding engaging tongues 1085. An L-shaped engaging portion 351 is formed on the securing flange 35 between the receiving bridges 355 for engaging with the fixing flange 108 of the front panel 10.

Figure 3:
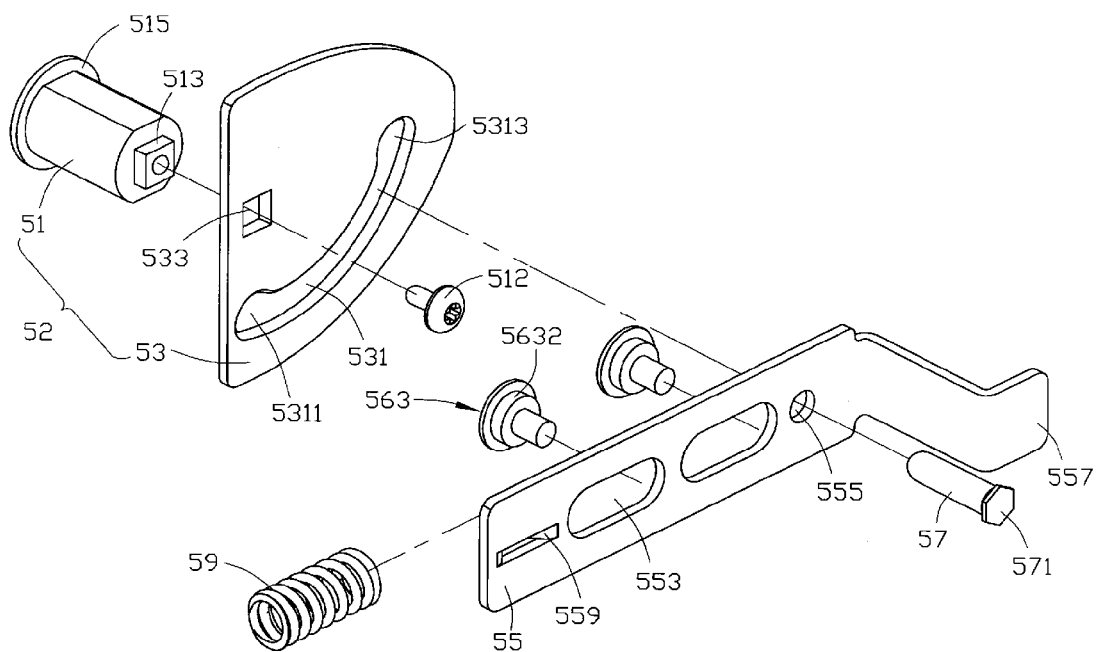
FIG. 3 is an exploded, isometric view of the locking apparatus of FIG. 1.
Figure 4:
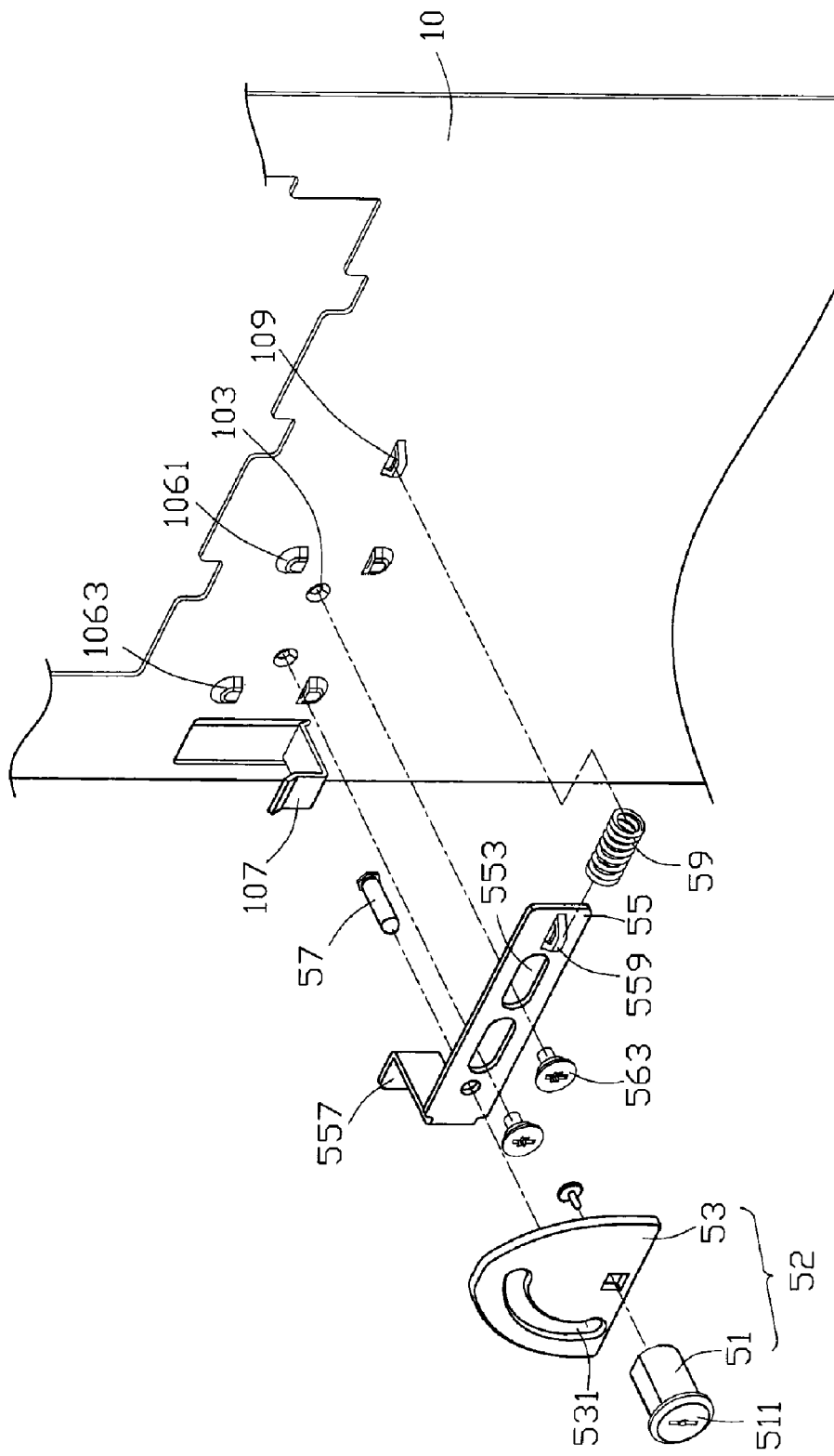
FIG. 4 is an exploded, isometric view of the locking apparatus and part of the front panel of FIG. 1.
Figure 5:
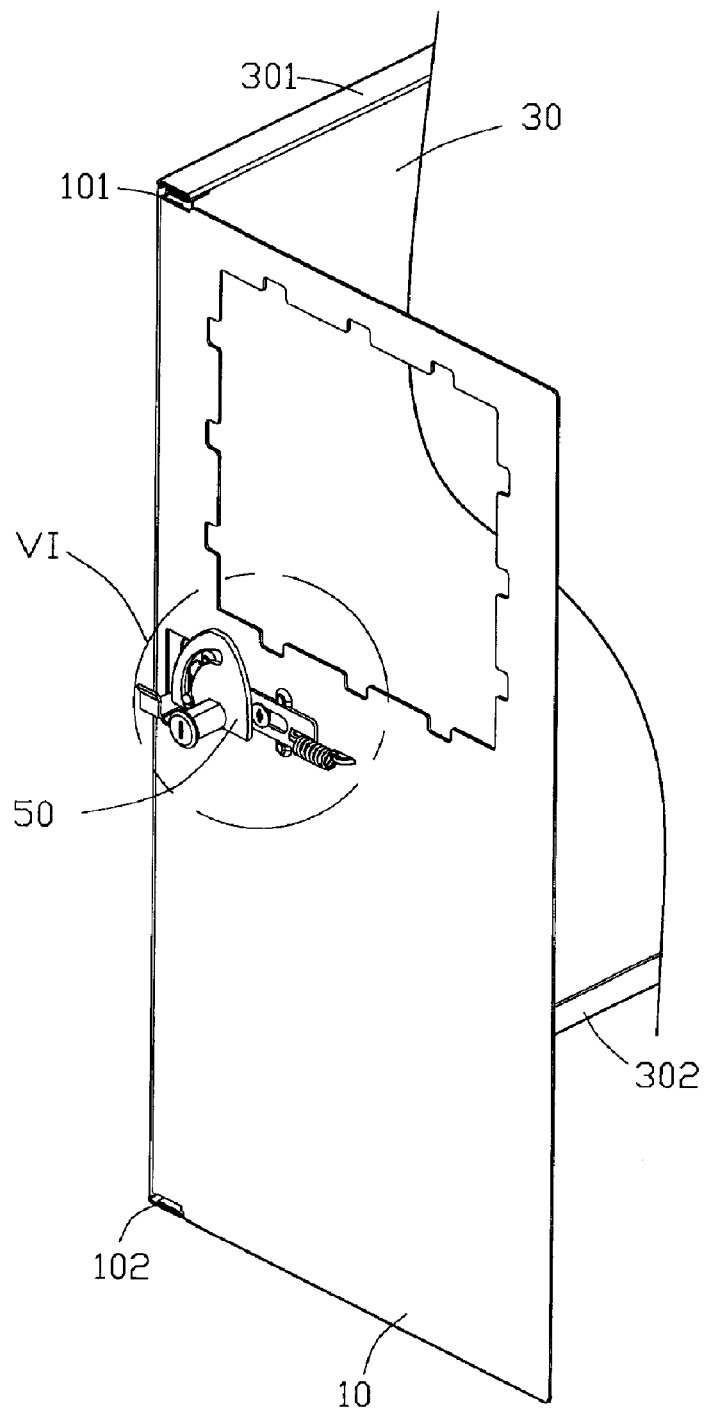
FIG. 5 is an assembled view of the locking apparatus, front panel, and part of the side panel of FIG. 1, showing the locking apparatus in an unlocked position.
Figure 6:
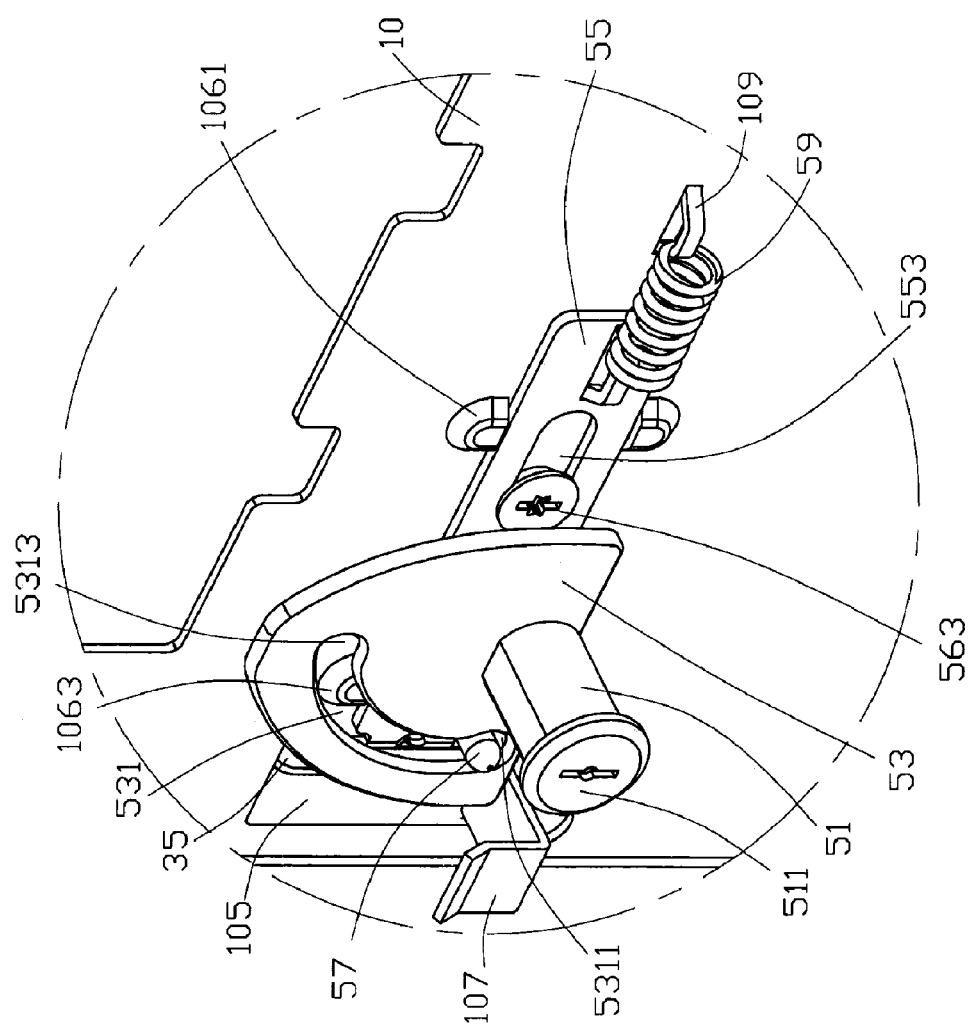
FIG. 6 is an enlarged view of portion VI in FIG. 5.
Figure 7:
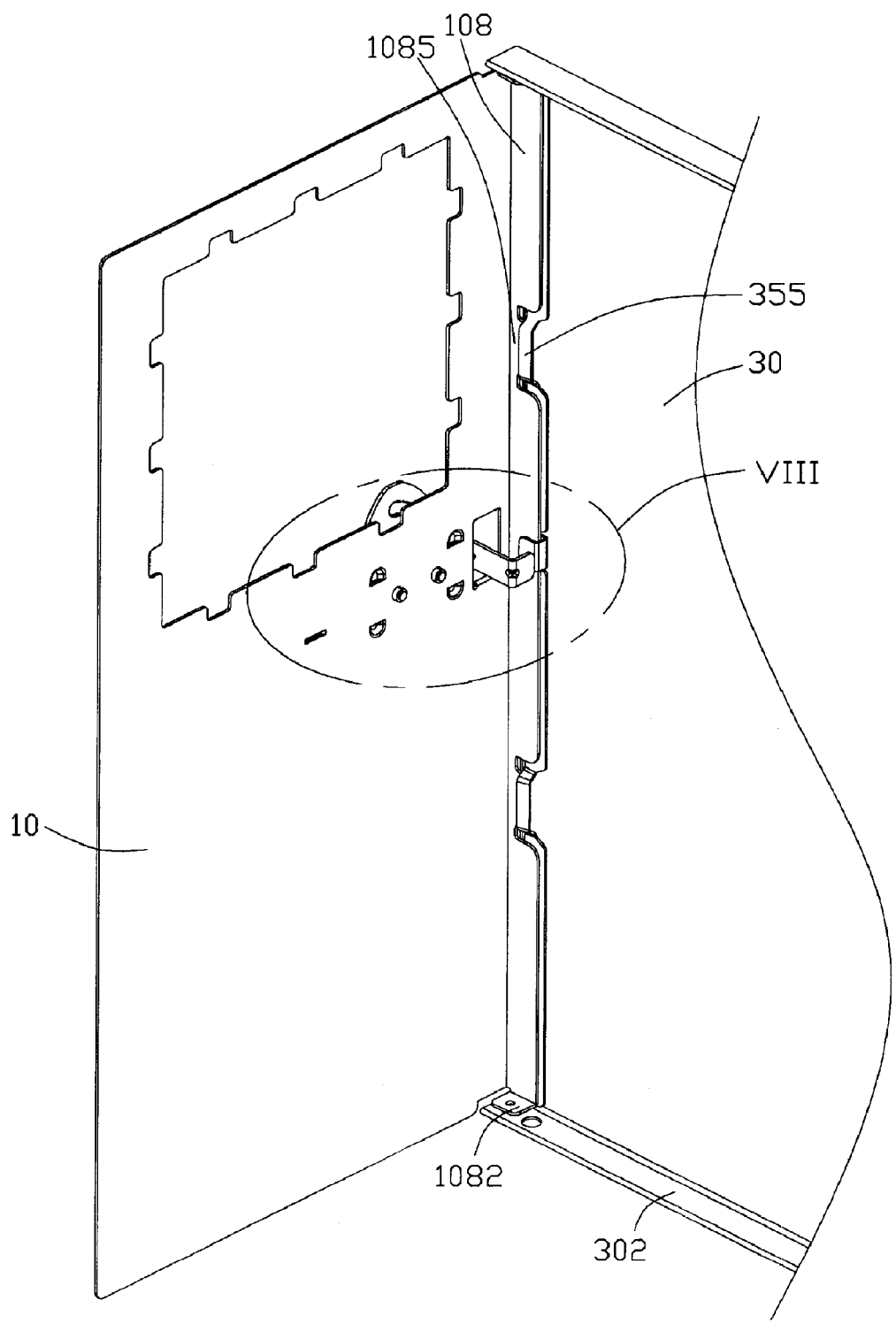
FIG. 7 is similar to FIG. 5, but viewed from another aspect.

Referring also to FIG. 3 and FIG. 4, the locking apparatus 50 includes an operating portion 51, an engaging board 53, a sliding member 55, and a spring 59. A blocking flange 515 is formed at a front portion of the operating portion 51. A lock 511 is fitted in the operating portion 51. The lock 511 can be rotated by a key in the operating portion 51. A cube-shaped engaging block 513 is formed on a back distal end of the lock 511. The engaging board 53 is fan shaped. A square engaging opening 533 is defined in the engaging board 53 for receiving the engaging block 513. A slot 531 is defined adjacent an arcuate edge of the engaging board 53. The slot 531 is arcuate shaped. A first receiving end 5311 and a second receiving end 5313 are respectively formed at opposite ends of the slot 531. A distance between the first receiving end 5311 and the engaging opening 533 is shorter than a distance between the second receiving end 5313 and the engaging opening 533. A screw 512 is provided to secure the operation portion 51 to the engaging board 53. The operation portion 51 and the engaging board 53 make up a driving member 52 for the locking apparatus 50. An L-shaped stop portion 557 is bent back at a distal end of the sliding member 55. Two restricting slots 553 are defined in the sliding member 55. Two orienting pins 563 are provided for attaching the sliding member 55 to the front panel 10. A circular flange 5632 is formed on each orienting pin 563 for preventing the sliding member 55 from moving perpendicularly away from the front panel 10. A securing bridge 559 is formed on the sliding member 55. A driving hole 555 is defined between the restricting slots 553 and the stop portion 557 for holding a driving pin 57.

Referring also to FIG. 5 to FIG. 8, in assembling the locking apparatus 50 to the front panel 10, the driving pin 57 is assembled through the driving hole 555 from a backside of the sliding member 55. The stop portion 557 of the sliding member 55 is inserted through the through opening 105 from a front side of the front panel 10. The sliding member 55 is slidingly positioned between each pair of positioning tabs 1061, 1063. The orienting pins 563 are secured to the corresponding securing posts 103 of the front panel 10 through the corresponding restricting slots 553. Therefore, the sliding member 55 can slide horizontally on the front penal 10. The spring 59 is connected to the securing bridge 109 of the front panel 10 and the securing bridge 559 of the sliding member 55. The operating portion 51 is inserted through the locking hole 22 of the front bezel 20. The engaging board 53 is secured to the engaging block 513 of the lock 511 by the screw 512.

In assembling the side panel 30 to the front panel 10, the front panel 10 is secured to a front side of the chassis 40. Then one side edge of the front bezel 20 is pivotally attached to the front panel 10, and an opposite side edge of the front bezel 20 is secured to the front panel 10. The driving pin 57 of the sliding member 55 is received in the slot 531 of the engaging board 53. The driving pin 57 is positioned in the first receiving end 5311 of the slot 531. The spring 59 keeps the sliding member 55 in an original position. The orienting pins 563 abut against a left end of the corresponding restricting slots 553. The side panel 30 is then slidably attached to the chassis 40. The engaging tongues 1085 are respectively received in the corresponding receiving bridges 355 of the side panel 30. The engaging portion 351 is engaged with the fixing portion 108 of the front panel 10.

Figure 9:
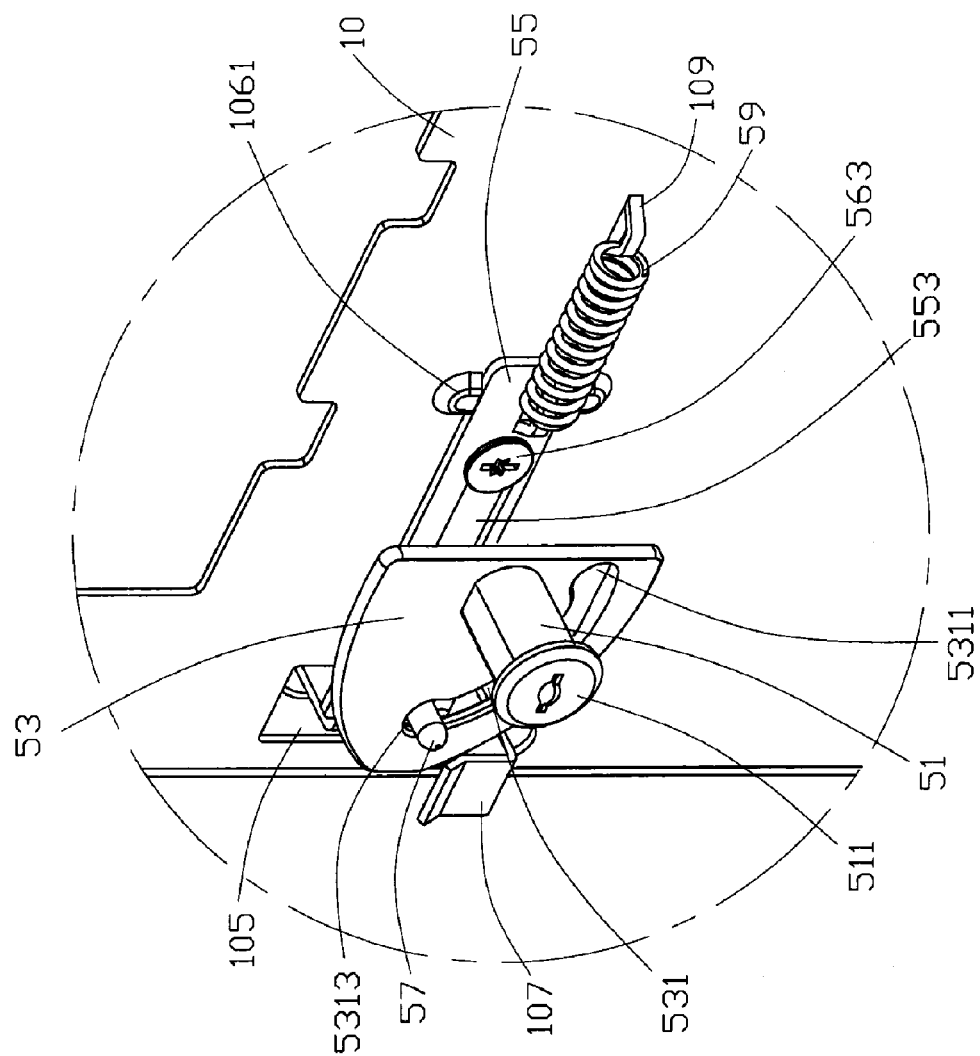
FIG. 9 is similar to FIG. 6, but showing the locking apparatus in a locked position.
Figure 10:
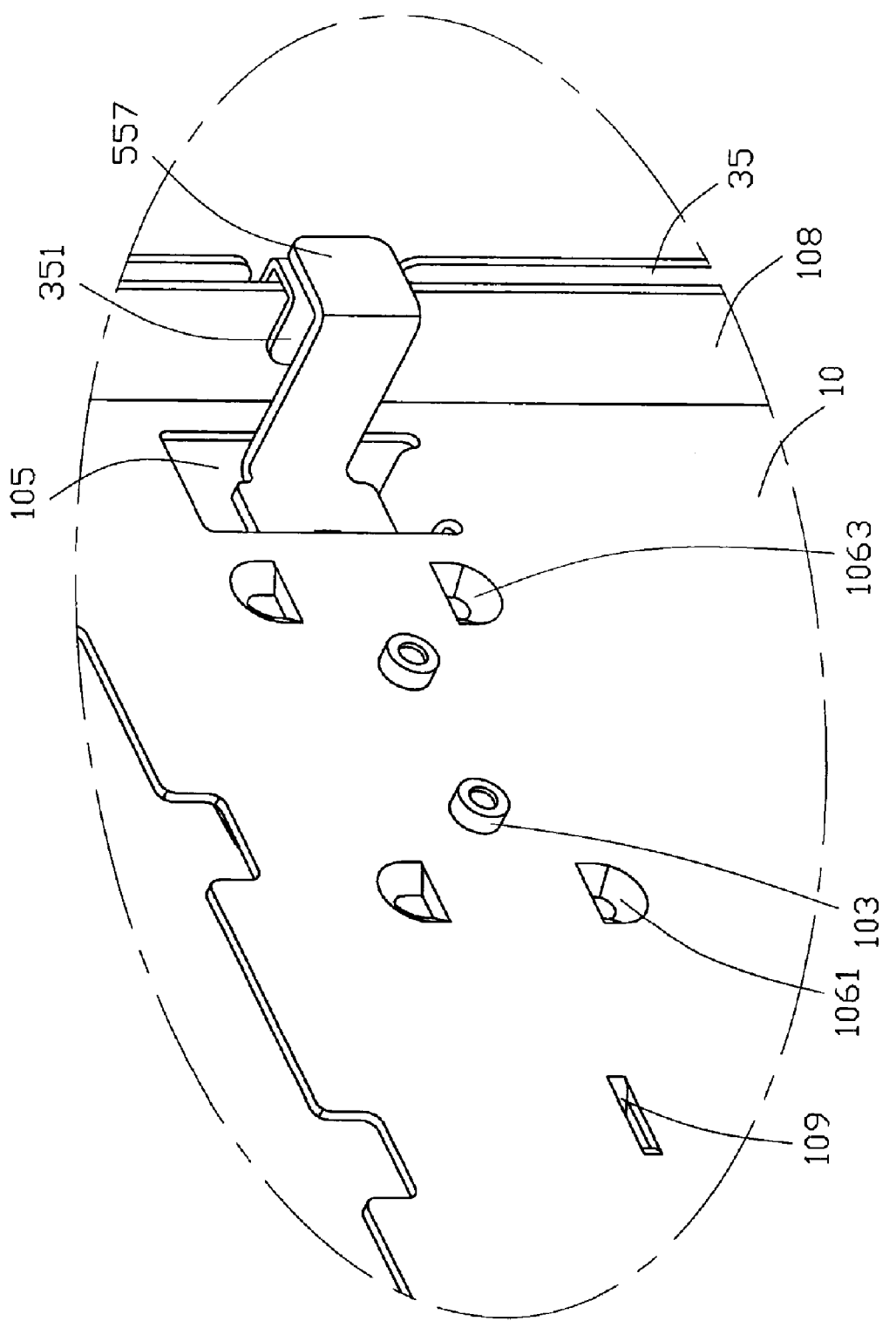
FIG. 10 is similar to FIG. 8, but showing the locking apparatus in a locked position.
Figure 11:
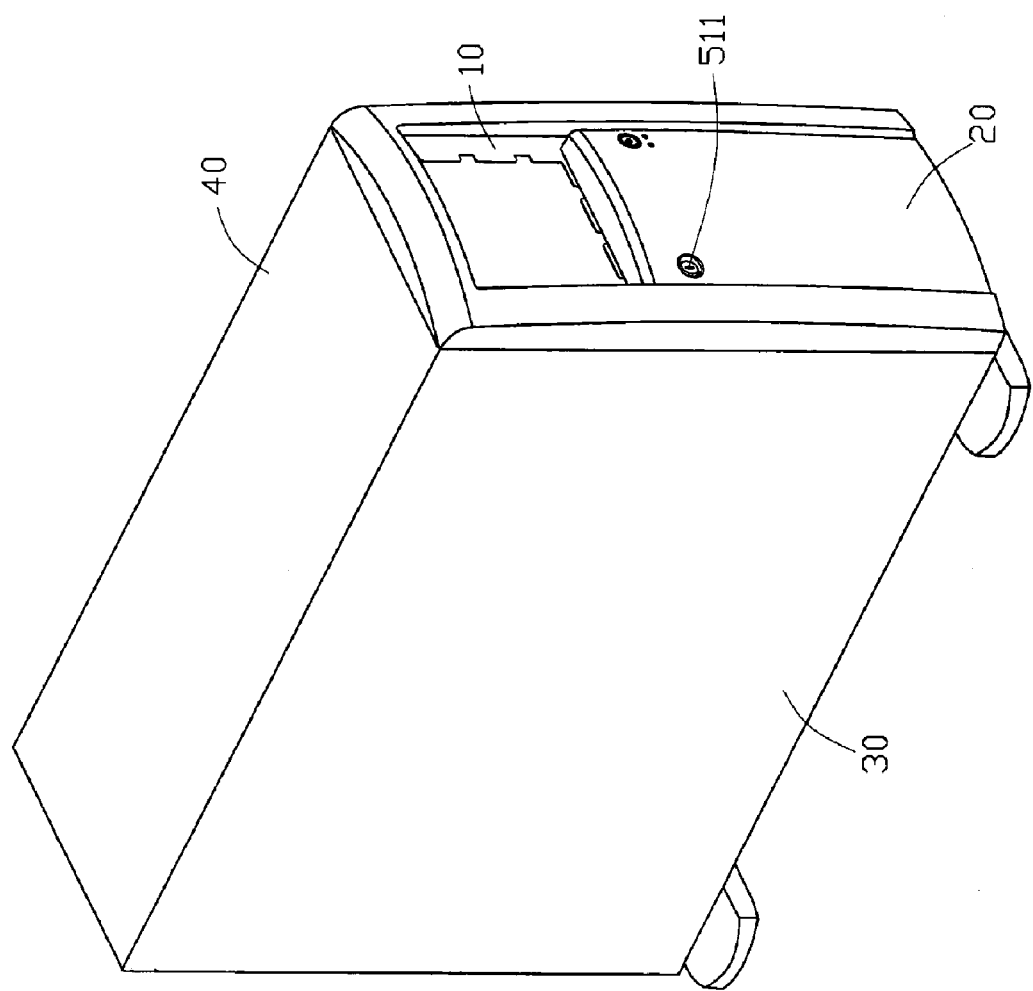
FIG. 11 is an assembled, isometric view of FIG. 1.

Referring also to FIG. 9 and FIG. 10, in locking the side panel 30 to the front panel 10, the lock 511 is rotated by the key in an anticlockwise direction in the operating portion 51, and the engaging board 53 is driven by the lock 511 to rotate along the same direction. The driving pin 57 slides along the slot 531 of the engaging board 55. An arcuate shaped side of the slot 531 movingly abuts against the driving pin 57 of the sliding member 55. Therefore, the driving pin 57 drives the sliding member 55 to move towards the side panel 30, and the spring 59 is stretched. When the driving pin 57 reaches the second receiving end 5313 of the slot 531, the arcuate edge of the engaging board 53 abuts against the restricting clip 107, and the orienting pins 563 abut against right ends of the corresponding restricting slots 553. The sliding member 55 is stopped in a locked position. The stop portion 557 of the sliding member 55 abuts against a backside of the engaging portion 351 and prevents the engaging portion 351 from back and away from the front panel 10. The engaging portion 351 is sandwiched between the stop portion 557 and the fixing portion 108. Finally, the lock 511 is locked by the key in this position. Thus, the side panel 30 is locked to the front panel 10.

Figure 8:
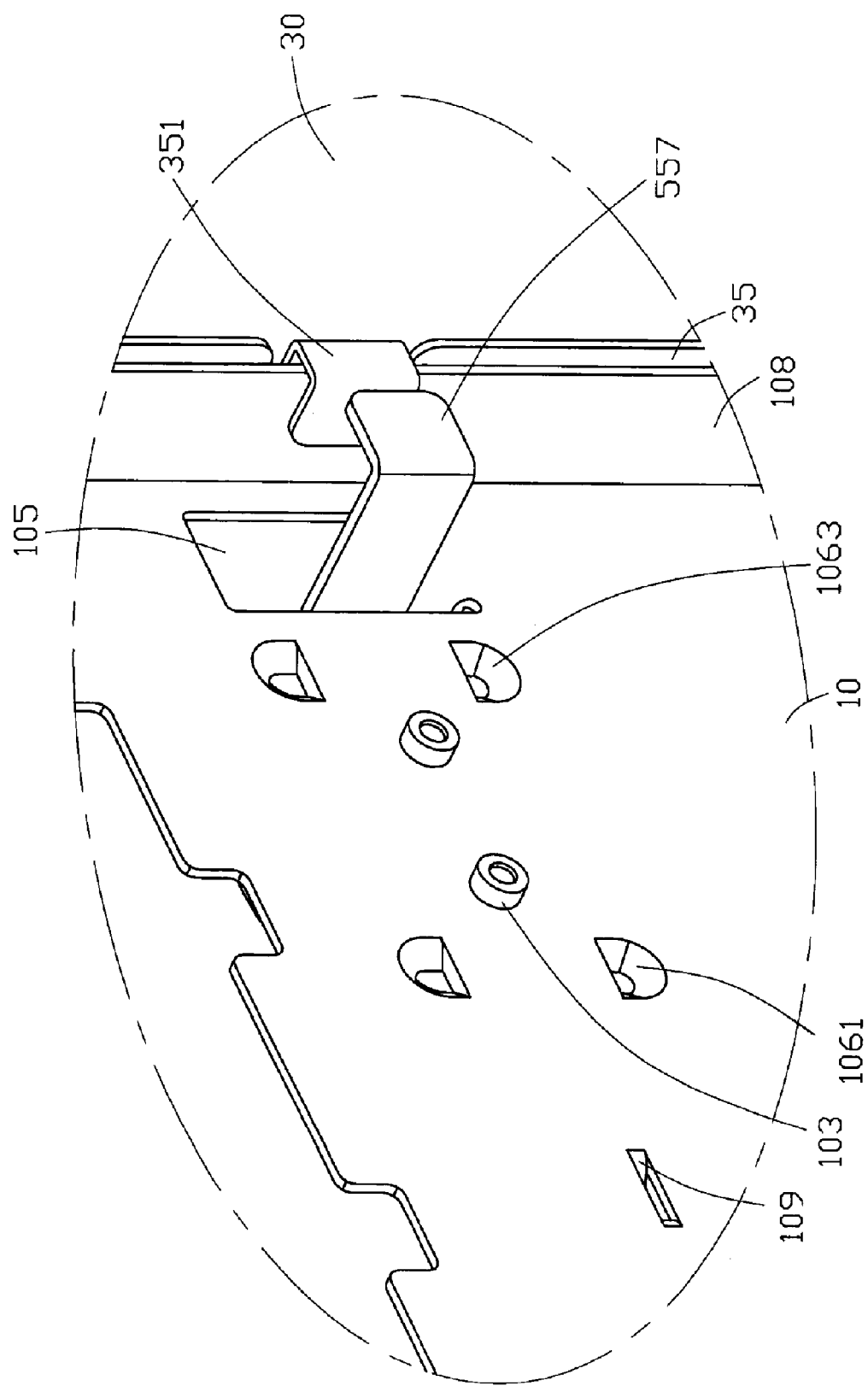
FIG. 8 is an enlarged view of portion VIII in FIG. 7.

In releasing the side panel 30 from the front panel 10, the lock 511 of the driving member 52 with engaging board 53 are rotated along clockwise direction. The driving pin 57 slides out from the second receiving end 5313, and slides along the slot 531. The sliding member 55 is moved away from the side panel 30 due to the rebounding of the spring 59, until the driving pin 57 reaches the first receiving end 5311. Simultaneously, the orienting pins 563 abut against the left ends of the corresponding restricting slots 553. The driving member 52 is rotated to the original position. Thus, the stop portion 557 is moved away from the engaging portion 351 of the side panel 30 as shown in FIG. 8. Then the side panel 30 can be slid away from the front panel 10.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a front panel;
   a side panel perpendicularly and slidably attached to the front panel, the side panel having an engaging portion;
   a sliding member attached to the front panel and being slidable along the front panel in a direction perpendicular to the side panel, the sliding member having a driving pin and a stop portion extending through the front panel configured for engaging with the engaging portion in another direction parallel to the side panel; and
   a driving member pivotably attached to the front panel, the driving member having an arcuate portion slidably engaging with the driving pin, the driving member capable of being rotated to cause the arcuate portion urging the driving pin of the sliding member to move the sliding member in the direction perpendicular to the side panel thereby the stop portion engaging with the engaging portion of the side panel to prevent the side panel from sliding way from the front panel in said another direction;
   wherein the front panel defines a through hole in said another direction, and the sliding member is slidably attached on a front surface of the front panel and the stop portion of the sliding member extends through the through hole to engage with the engaging portion at a back side of the front panel.

2. The computer enclosure as claimed in claim 1, wherein the front panel comprises a flange bent backward from one side edge thereof, the side panel comprises a receiving bridge, and an engaging tongue is formed at the flange and inserted into the receiving bridge in said another direction.

3. The computer enclosure as claimed in claim 1, further comprising a front bezel covering the front plate, wherein the driving member is disposed between the front plate and the front bezel, and the driving member comprises an operating portion accessible on the front bezel configured for being operated to drive the driving member.

4. The computer enclosure as claimed in claim 1, wherein the engaging portion of the side panel is L shaped, and the stop portion is L shaped and covers the engaging portion.

5. A computer enclosure, comprising:
   a front panel;
   a side panel perpendicularly and slidably attached to the front panel, the side panel having an engaging portion;
   a sliding member attached to the front panel and being slidable along the front panel in a direction perpendicular to the side panel, the sliding member having a driving pin and a stop portion extending trough the front panel configured for engaging with the engaging portion in another direction parallel to the side panel; and a driving member pivotably attached to the front panel, the driving member having an arcuate portion slidably engaging with the driving pin, the driving member capable of being rotated to cause the arcuate portion urging the driving pin of the sliding member to move the sliding member in the direction perpendicular to the side panel thereby the stop portion engaging with the engaging portion of the side panel to prevent the side panel from sliding way from the front panel in said another direction;

wherein the front panel comprises a flange bent backward from one side edge thereof, the side panel comprises a receiving bridge, and an engaging tongue is formed at the flange and inserted into the receiving bridge in said another direction.

6. The computer enclosure as claimed in claim 1, wherein the arcuate portion is an arcuate slot defined in the driving member, the driving pin is received in the arcuate slot, and the driving pin is driven to move along a direction perpendicular to the side panel by rotating the driving member.

7. The computer enclosure as claimed in claim 5, wherein the arcuate portion is an arcuate slot defined in the driving member, the driving pin is received in the arcuate slot, and the driving pin is driven to move along a direction perpendicular to the side panel by rotating the driving member.

* * * * *